(12) United States Patent
Long et al.

(10) Patent No.: US 7,787,497 B1
(45) Date of Patent: Aug. 31, 2010

(54) SYSTEM FOR GROUPING ATTRIBUTES IN PACKETS IN A RADIUS PROTOCOL

(75) Inventors: Allen Long, Pleasanton, CA (US); Murtaza S. Chiba, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1273 days.

(21) Appl. No.: 10/379,513

(22) Filed: Mar. 3, 2003

(51) Int. Cl.
H04J 3/00 (2006.01)
H04L 12/54 (2006.01)

(52) U.S. Cl. .................. 370/476; 709/236; 370/428

(58) Field of Classification Search .......... 370/328, 370/338, 349, 428, 476, 352, 456, 252; 713/171, 713/161; 709/236, 246; 714/45; 455/411
See application file for complete search history.

(56) References Cited

U.S. PATENT DOCUMENTS

| | | | | |
|---|---|---|---|---|
| 4,792,944 A * | 12/1988 | Takahashi et al. | ........... | 370/458 |
| 5,754,768 A * | 5/1998 | Brech et al. | ........... | 709/230 |
| 6,092,118 A * | 7/2000 | Tsang | ........... | 709/246 |
| 6,628,671 B1 * | 9/2003 | Dynarski et al. | ........... | 370/469 |
| 6,675,284 B1 * | 1/2004 | Warren | ........... | 712/38 |
| 6,928,604 B2 * | 8/2005 | Park et al. | ........... | 714/788 |
| 6,971,005 B1 * | 11/2005 | Henry et al. | ........... | 713/155 |
| 7,231,456 B1 * | 6/2007 | Chiba et al. | ........... | 709/236 |
| 7,421,695 B2 * | 9/2008 | Murray et al. | ........... | 718/105 |
| 7,443,824 B1 * | 10/2008 | Lipford et al. | ........... | 370/338 |
| 7,493,394 B2 * | 2/2009 | Zavalkovsky et al. | ........... | 709/225 |
| 2002/0154360 A1 * | 10/2002 | Liu | ........... | 359/135 |
| 2003/0055964 A1 * | 3/2003 | Rezaiifar et al. | ........... | 709/225 |
| 2003/0091013 A1 * | 5/2003 | Song et al. | ........... | 370/338 |
| 2003/0177267 A1 * | 9/2003 | Orava et al. | ........... | 709/245 |
| 2004/0030763 A1 * | 2/2004 | Manter et al. | ........... | 709/223 |
| 2004/0106393 A1 * | 6/2004 | Chowdhury et al. | ........ | 455/406 |
| 2004/0133698 A1 * | 7/2004 | Swoboda et al. | ........... | 709/236 |
| 2004/0225898 A1 * | 11/2004 | Frost et al. | ........... | 713/201 |
| 2005/0021956 A1 * | 1/2005 | Genty et al. | ........... | 713/170 |
| 2005/0081036 A1 * | 4/2005 | Hsu | ........... | 713/171 |
| 2005/0102393 A1 * | 5/2005 | Murray et al. | ........... | 709/224 |
| 2005/0198190 A1 * | 9/2005 | Zavalkovsky et al. | ........ | 709/217 |
| 2007/0094401 A1 * | 4/2007 | Gagne et al. | ........... | 709/229 |
| 2008/0104678 A1 * | 5/2008 | Hsu | ........... | 726/4 |
| 2008/0313274 A1 * | 12/2008 | Murray et al. | ........... | 709/203 |

OTHER PUBLICATIONS

Zorn (IETF RFC 2548 / RFC2548, Microsoft Vendor-specific RADIUS Attributes, Mar. 1999).*
Junos Radius Authentication; Stephen Gill; Revision: 1.1, Nov. 19, 2001.*
Fulfillment of G-8000 Vendor-Specific Attributes Based on RADIUS Server; Computer Science-Technology and Applications, 2009. IFCSTA '09. International Forum on Issue Date : Dec. 25-27, 2009.*

* cited by examiner

Primary Examiner—Salman Ahmed
(74) Attorney, Agent, or Firm—Cesari and McKenna, LLP

(57) ABSTRACT

A system for inserting data into data packets of a protocol for transmitting network information between processing systems connected to a network. The system identifies attributes of the network to be transmitted in a packet. The system then forms a group of attributes that are closely related. A beginning of group identifiers inserted into a packet. The group is then inserted into the packet following the identifier. An end of group identifier inserted into the packet after the group.

6 Claims, 6 Drawing Sheets

SYSTEM FOR GROUPING ATTRIBUTES IN PACKETS IN A RADIUS PROTOCOL

BACKGROUND OF THE INVENTION

1. Field of the Invention

The present invention relates to protocol for transmitting data packets between processing systems in a network. More particularly, this invention relates to grouping related attributes in a packet. Still more particularly, this invention relates to grouping attributes in the RADIUS protocol and using a specific attribute to identify a beginning and an ending of a group of attributes.

2. The Prior Art

There are many protocols in use today for transmitting data between processing units connected in a network. A protocol is a system or method for arranging data in packets for transmission between processing units. For purposes of this discussion, processing units are a processor and/or microprocessor connected to memory and executing instructions to provide applications that manipulate data. The protocol used determines how data is arranged in a packet to allow a processing unit receiving the data to read the data from the packet.

One protocol for transmitting data is RADIUS. RADIUS is a protocol for transmitting accounting, authentication, authorization, and configuration data between processing systems in a network. Thus, RADIUS is used by processing systems to allocate resources and establish connections to facilitate communication of processing units across the network.

A particular example of the use of Radius to allocate resources in a network is establishing a Virtual Private Network (VPN). In order to establish a VPN between processing systems, the processing systems transmit packets including attributes. An attribute provides authorization information for user and resources that a user has access to over the network. Sometimes a packet may include multiple attributes that relate to a VPN tunnel. These attributes are related as the attributes are for establishing the same VPN tunnel.

Other times, the packet may include alternative groups of attributes for using alternative resources of the network to establish the VPN tunnel. Currently, each attribute in a group must include a tag that identifies the attribute as part of a group. Currently, tags are mainly used to identify RADIUS Request For Comments (RFC) space tunnel attributes. However, this solution is inadequate when the attributes in the packet include both RADIUS RFC 2868 standard space attributes and Vendor Specific Attributes (VSAs). Therefore, those skilled in the art realize a need for a manner in which to insert and identify groups and/or sub-groups with a group of attributes in a packet that includes one or more groups of attributes.

BRIEF DESCRIPTION OF THE INVENTION

This patent discloses and claims a useful, novel, and unobvious invention for grouping attributes in a packet generated and transmitted in a protocol. Specifically, an embodiment of this invention relates to grouping attributes in a packet of the RADIUS protocol. An embodiment of this invention relates to using a VSAs, denoted as identifiers, to identify the start and end of a group. All of the attributes placed in the packet between start and end identifiers are part of the group. This saves overhead in the packet as a tag is not needed for each attribute in a group. Further, more than one group may be inserted into the packet. Furthermore, sub-groups of attributes may be included in the packet by nesting the identifiers in a group. The attributes of the sub-groups are then placed between the nested identifiers in the packet. This allows a protocol, such as RADIUS, to provide multiple groups of attributes in a packet without additional overhead and without the use of tags. The protocol may also indicate hierarchy in the groups of attributes.

An embodiment of this invention is provided by instructions stored as software or firmware and executed by a processor or by hardware configured to perform the function of the instructions. In accordance with an embodiment of the present invention, a process for inserting attributes into a packet is performed in the following manner. The process begins by identifying attributes of the network to be transmitted in a packet. The process then forms groups of attributes to be inserted in the packet. The process begins to insert attributes individually into the packet, When a group of attributes to be inserted is to be inserted into the packet, the process inserts a beginning of group identifier into the packet. The attributes of the group are then inserted into the packet behind the beginning of group identifier. An end of group identifier is inserted into the packet behind a last attribute of the group to identify the end of the group. This process is preferably used in the RADIUS protocol in which a seldom used or unused vendor specific attribute may be used as the beginning of group identifier and/or the end of group identifier.

Sometimes a group of attributes may include a sub-group of attributes that are more closely related than other attributes in the group. In accordance with an embodiment of this invention, the process performs the following steps to insert a subgroup into the packet. The process begins by forming a sub-group of at least two of the attributes of the group. A beginning of group identifier is inserted into the packet behind one of the attributes of the main group. The process inserts the sub-group of attributes immediately behind the beginning of group identifier for the sub-group. An end of group identifier is inserted immediately behind the sub-group.

After the group is inserted into the packet, the process transmits the packet from a first processing system to a second processing system. The second processing system receives the packet and uses the following process to identify groups of attributes in the packet. The process begins by reading the packet. The process then detects a beginning of group identifier. Each attribute in the group is then read from the packet. The end of the group is detected when the end of Identifier is read from the packet.

BRIEF DESCRIPTION OF THE DRAWING FIGURES

The above and other features and aspects of this invention can be understood from the following detailed description given below and the following drawings.

DETAILED DESCRIPTION OF THE INVENTION

The following description of a system for generating packets in a protocol with groupings of attributes is not intended to limit the scope of the invention to these preferred embodiments, but rather to enable any person skilled in the art to make and use the invention.

Figure 1:
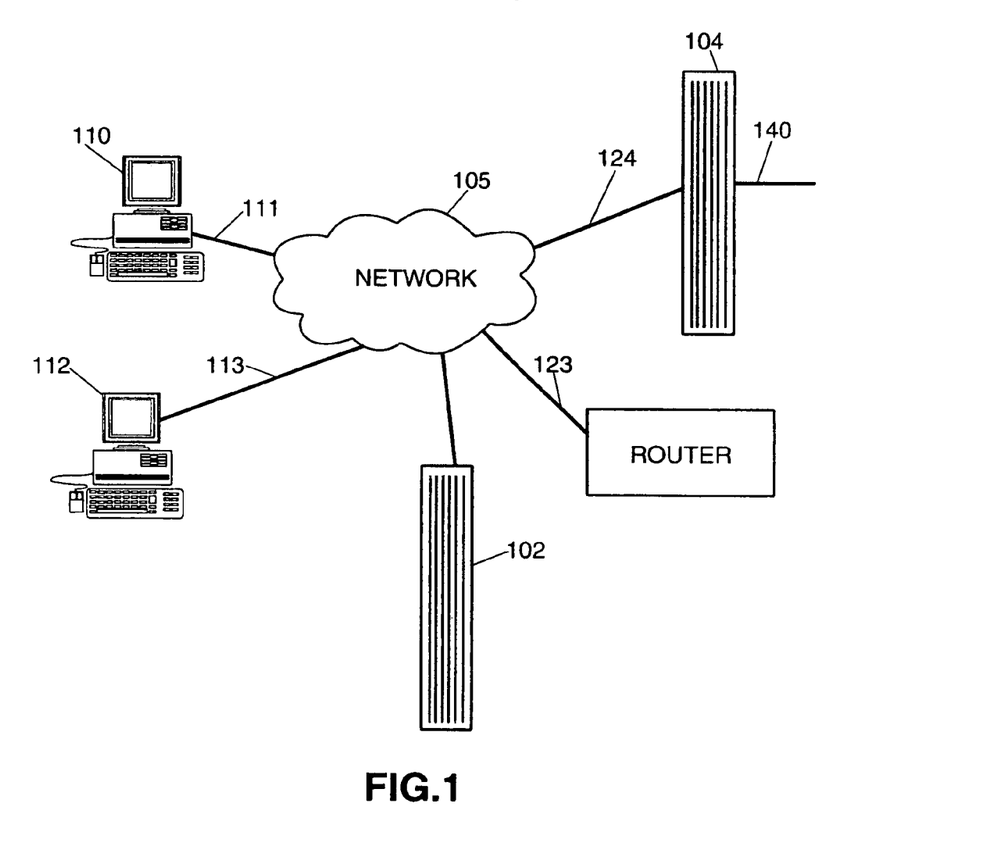
FIG. 1 illustrating a block diagram of a network using a protocol in accordance with an embodiment of this invention.

FIG. 1 illustrates a system 100 having processing systems connected to network 105. For purposes of this discussion, a processing system is any system having a processor, microprocessor or any combination of processors and/or microprocessors to execute instructions stored in a memory to perform applications for handling data. In system 100, personal computers 110 and 112 are connected to network 105 via paths 111 and 113 to communicate with other processing systems in the network. Server 102 is connected to network 105 and provides various applications to other processing systems. Router 103 is connected to network 105 via path 123 and manages communication over network 105. Gateway server 104 is connected to network 105 via path 124 and connects to the servers via path 140 to provide Internet service, and other connections for use of network 105.

In network 105, data packets are used to transmit data between the processing systems. In order to communicate, various protocols are used to generate transmitted packets so that when a packet is received by another processing system, the processing system can properly read the data from the packet. Different protocols may be used by the processing systems to communicate. Sometimes, the protocol used depends on the function that the transmitted data is used to provide.

One example of a protocol is RADIUS. RADIUS is used when a processing system, such as a personal computer 110 or 112 connects to network 105. Router 103 executes a variety of application to authenticate a user logged into the personal computer 110 or 112, allocate resources in network 105 and setup connections along the network to provide various types of communications such as a Virtual Private Network (VPN). RADIUS is used to transmit the packets between the various processing systems to transmit the data in a known format so that the receiving processing system may read the data from the packets.

Figure 2:
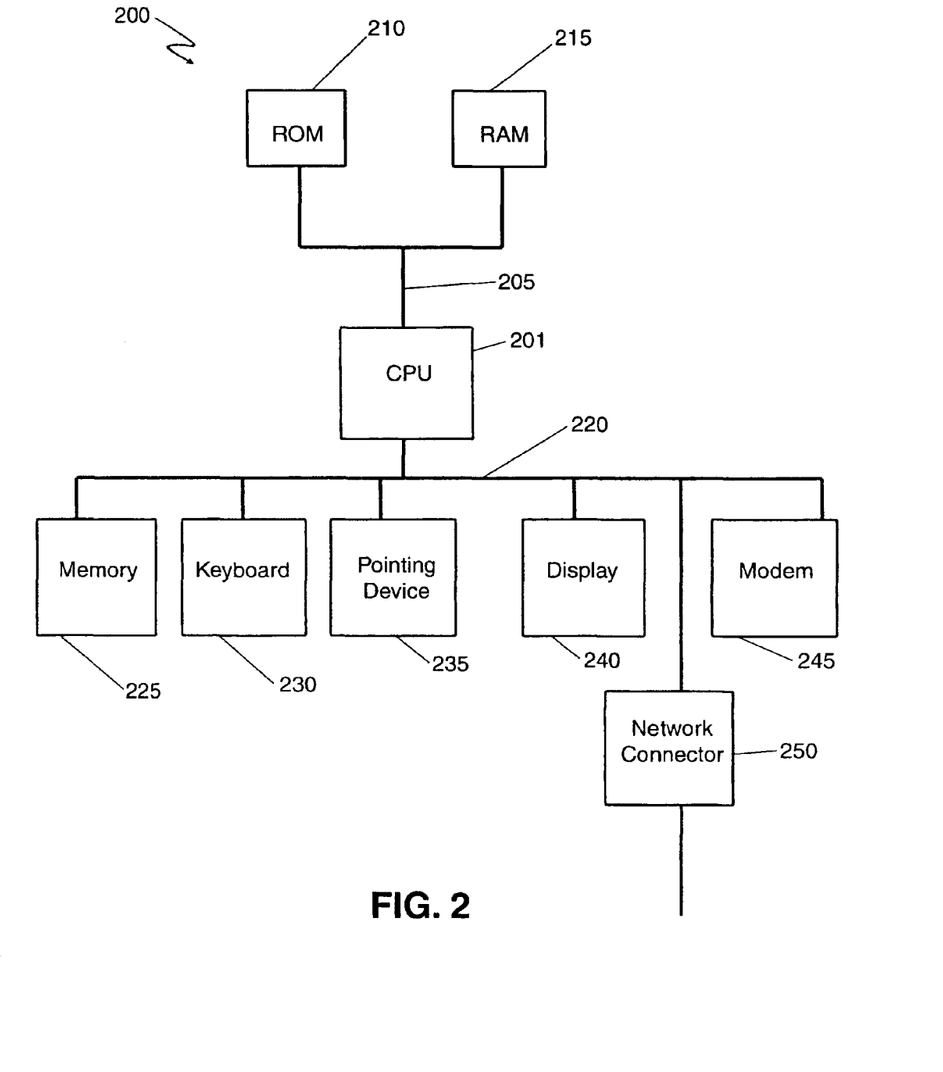
FIG. 2 illustrating a block diagram of a processing system that communicates using the protocol in accordance with an embodiment of this invention.

FIG. 2 illustrates a block diagram of an exemplary processing system 200 connected to network 105. Each of the processing systems such as personal computers 110, 112, server 102, router 103, and gateway computer 104 include the basic components of processing system 200. One skilled in the art will recognize that the various processing systems may include other components or other configurations depending on the particular function of the processing system.

Processing system 200 includes a Central Processing Unit (CPU) 200. CPU 200 is a processor, microprocessor, or combination of processors and/or microprocessors. The processor and/or microprocessor includes register and other circuitry for executing instructions stored in a memory to provide applications for processing data. The CPU may also include firmware which is circuitry that stores instructions for various applications.

Memory bus 205 connects CPU 201 to memories for storing executable instructions and data for applications being executed by CPU 201. A non-volatile memory such as Read Only Memory (ROM) 210 may be connected to memory bus 205. ROM 210 stores instructions for drivers and configuration data for processing system 200. A volatile memory, such Random Access Memory (RAM) 215 is also connected to memory bus 205. RAM 215 stores data and instructions for applications being executed by CPU 201. One skilled in the art will recognize that other types of volatile memory SRAM and DRAM may also be connected. One skilled in the art will also recognize that memory caches may also be included in the memories.

Input/Output bus 220 connects CPU 201 to peripheral devices for transmission of data between CPU 201 and the peripheral devices. Examples of peripheral devices that may be connected to I/O bus 220 include memory 225, keyboard 230, pointing device 235, display 240, modem 245, and network connector 250. Those skilled in the art will recognize that these devices are shown for exemplary purposes and any of the devices may not be included in a processing system or other device may be included.

Memory 225 is a device for storing data and instructions for applications on a media. Memory 225 may include a disk drive for storing data to a magnetic tape, or a optical device for writing the data to optical format such as a CD. Keyboard 230 is a device for inputting alpha-numeric data by user. Pointing device 235 is a mouse, touch pad or other such device used to receive input for moving an icon or "pointer across a screen. Display 240 is a device that receives data and displays the data on a monitor. Modem 245 is a device that connects to a telephone and converts data to signals for transmission over the telephone line. Network device 250 is a device that connects system 200 to a network to send and receive data over the network. An example of a network device 250 is an "Ethernet Card" which includes circuitry for connecting to a network.

This invention relates to grouping of attributes in a packet. In particular, this invention relates to grouping of attributes in a packets generated in the RADIUS protocol. In the Radius protocol, attributes for various resources may be used to provide a function. For example, a group of attributes may be used to provide a tunnel. For purposes of this discussion, a tunnel is specific route through the network for transmitting data between processing systems. In a packet, there may be more than one group of related attributes. For example, alternate tunnels may be given in the packet. Therefore, the groups of related attributes must be identified.

In the prior art, a flag indicating an attribute was in a group was set for the attribute. A tag then followed. The tag was a string of bits that was a unique identifier for each member of a group. However, the number of groups was limited by the number of combinations of the bit string in the tag. Furthermore, extra payload is added to by requiring a tag for each attribute in the packet.

The present invention allows attributes to be identified in a group without the use of a flag and a tag. In accordance with an embodiment of the present invention, a unused attribute identifier or other type of identifier is used to indicate the beginning of a group of attribute. The same identifier or another identifier is then used to indicate the end of the group. All of the attributes in the group are then placed between the beginning and end identifiers. Sub-groups may be indicated by nesting identifiers or using unique identifiers for the beginning and end of the sub-group within the group.

Figure 3:
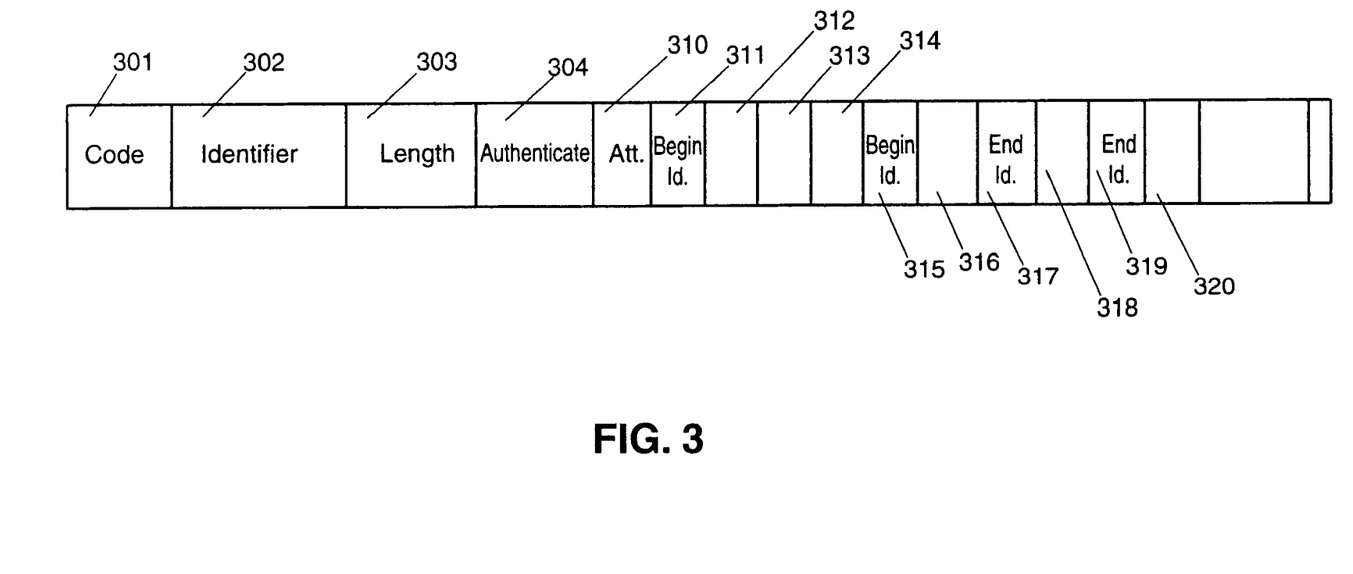
FIG. 3 illustrating a block diagram of an exemplary embodiment of a data structure of a packet generated in the protocol in accordance with this invention.

FIG. 3 illustrates packet 300 including group identifiers in accordance with an embodiment of this invention. Packet 300 is generated in a protocol, such as RADIUS, for transmission of data between processing systems. Packet 300 includes code field 301 which indicates the type of packet being transmitted. For example, in RADIUS, a packet may be generate for an access request, an access response, accounting issues, or status of a client or server. In RADIUS, the code field is an octet long. An identifier field 302 is used to match requests and replies between processing systems. In RADIUS, identifier field 302 is one octet. Length field 303 indicates the total bit length of the packet including all of the fields. In RADIUS, the length field is two octets long.

Authenticator field 304 is a random number used to authenticate message packets transmitted between processing systems. In RADIUS, authenticator field 304 is two octets in length. After authenticator field 304, packet 300 includes attributes 310-3. Attributes are of varying length have varying field depending on the attribute being sent. A list of the attributes in RADIUS and the various formats of a field are beyond the scope of this invention and are omitted for brevity.

In accordance with an embodiment of the present invention, attribute 310-320 include a beginning group identifier 311 and an end group identifier 319. The beginning group identifier is a unique identifier that may be an unused attribute identifier or other unique code that represents a beginning of a group of related attributes. For example, the group may include all of the attributes for a particular VPN tunnel. An end of group identifier 319 is a second unused attribute identifier or may be the same identifier as the beginning group identifier and signals an end of the group. All attributes between the beginning and the end group identifier are part of the group. In order to check that all of the attributes in the group are accounted for, the beginning group identifier may include a field that gives the bit length of the group. In the group identified by beginning identifier 311 and end identifier 319, there is a sub-group of more closely related attributes. The sub-group is denoted by beginning sub-group identifier 314 and end sub-group identifier 317. Attributes 315-316 are attributes in the sub-group. Beginning sub-group identifier 314 may be the same identifier as beginning group identifier 311 or may be another unused or seldom used identifier. End sub-group identifier 317 may be the identifier as end group identifier 319.

Figure 4:
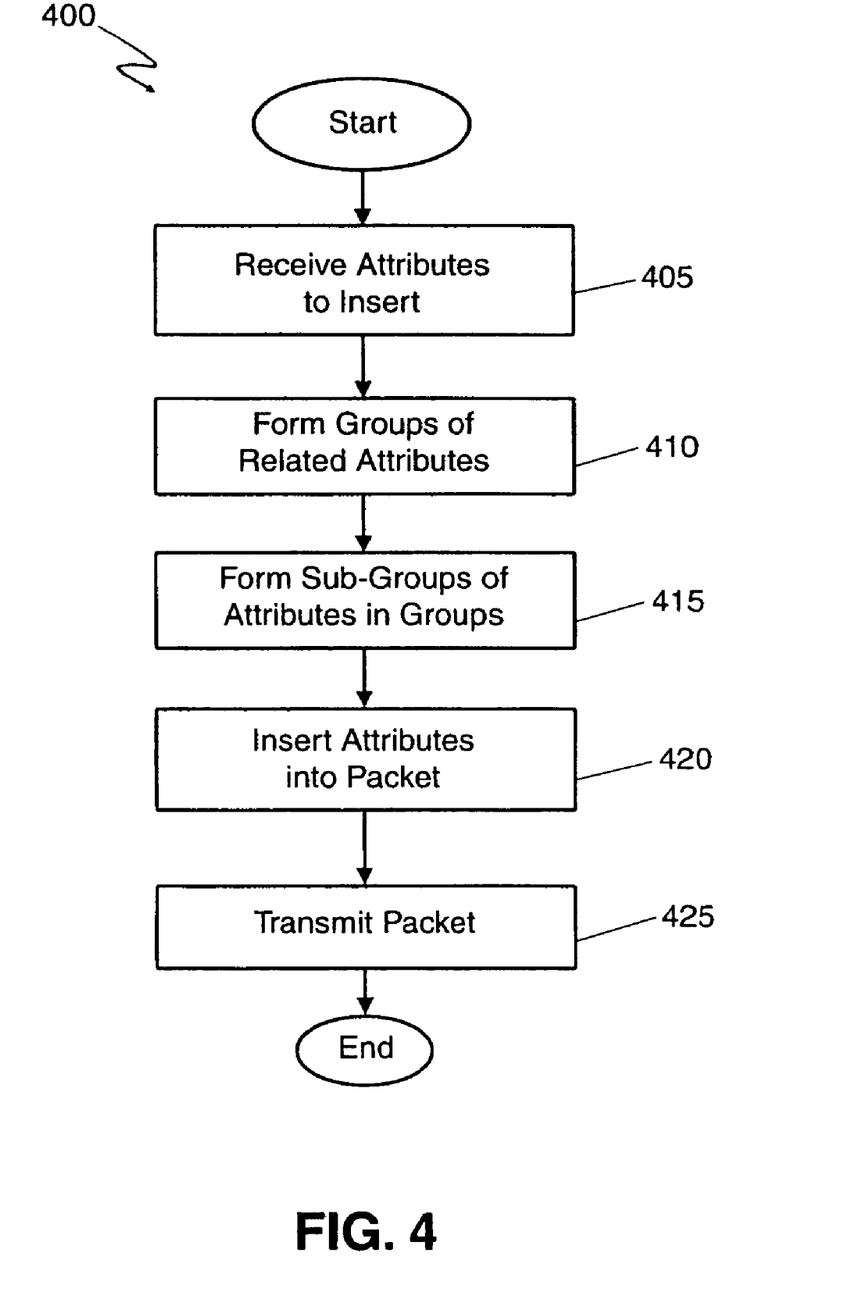
FIG. 4 illustrating a flow diagram for generating and transmitting packets in accordance with the invention in accordance with an embodiment of this invention.

FIG. 4 illustrates a flow diagram of an exemplary process 400 for generating a packet 300 in accordance with this invention. One skilled in the art will recognize that the steps of this process may be performed by in other orders and steps. One skilled in the art will recognize that this process is completed in the same manner regardless of the protocol of the packets being generated. One skilled in the art will further recognize that this process is a sub-process of a process for generating the packets and only relates to insertion of the attributes into the packet.

Process 400 begins in step 405 by receiving the attributes to insert in the packet for transmission. In step 410, process 400 groups related attributes. The grouping may be accomplished in any number of ways including, but not limited to, the application sending the attribute, order of receipt, or an identifier in the attribute. In step 415, subgroups of attributes in each group of attributes are formed by the process 400. In step 420, the attributes are inserted into the packets as described below by process 500 shown in FIG. 5. Process 400 ends in step 425 by transmitting the packet.

Figure 5:
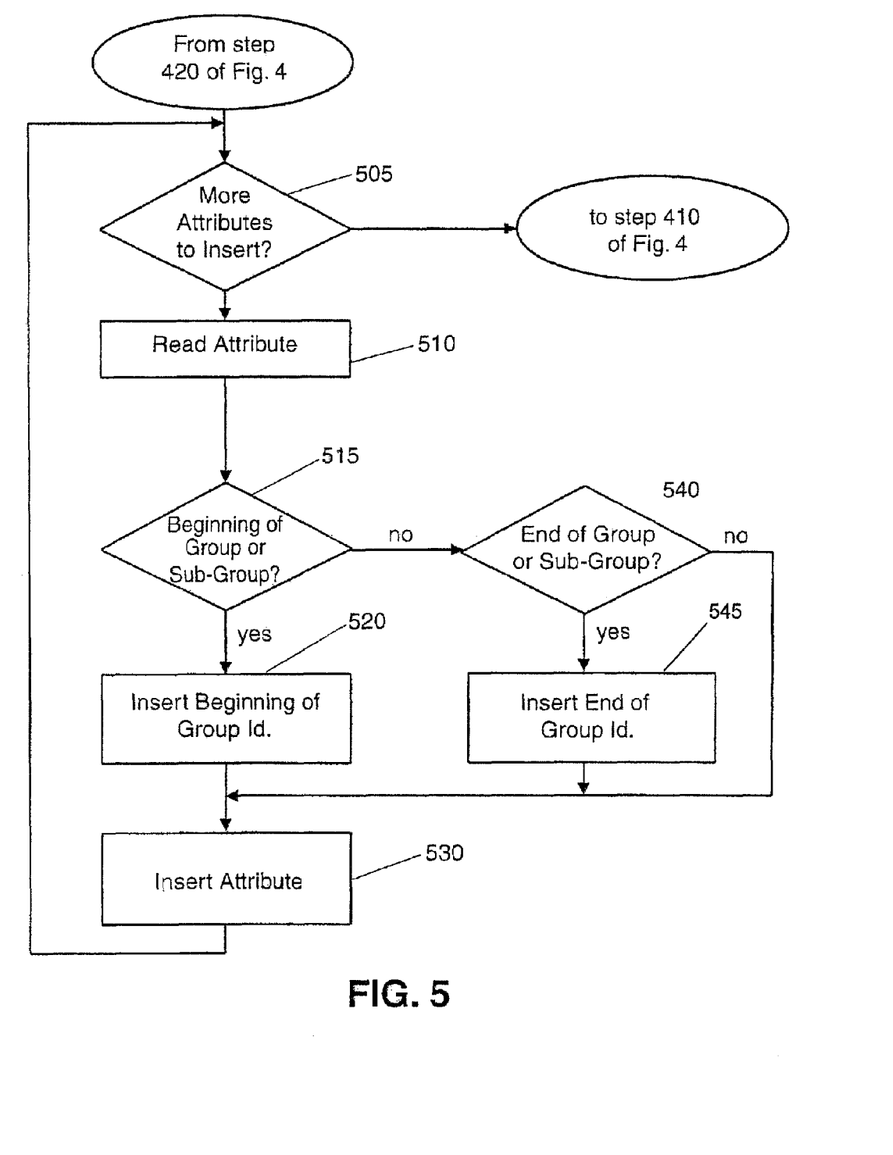
FIG. 5 illustrating a flow diagram of a process for inserting groups of attributes in a packet in accordance with an embodiment of this invention.

FIG. 5 illustrates an exemplary process 500 for inserting attributes into a packet. Process 500 begins in step 505 by determining whether there is at least one attribute remaining that is to be inserted into the packet. If there are no attributes to insert remaining to be inserted into the packet, process 500 ends.

If there is at least one attribute to insert remaining, process 500 reads an attribute in step 510. In step 515, process 500 determines whether the attribute is the beginning of a group or a beginning of a sub-group. Whether an attribute is the beginning of a group may be determined by a tag in the attribute or some other indication of that the attribute is a beginning of a group. Whether an attribute is a beginning of a sub-group may be determined by reading a tag in the attribute identifying the attribute as a beginning of a sub-group or through receiving a beginning of group indicator after receiving a previous beginning of group indicator but prior to receiving an end of group indicator.

If the attribute is the beginning of a group or a sub-group, a beginning of group identifier is inserted into the packet in step 520. As stated above, the beginning of group identifier may include a field that gives a bit count of the length of the group. If the attribute is the beginning of a sub-group, the beginning of group identifier inserted in step 520, may be the same attribute used as the beginning of group identifier, or the sub-group identifier may be another unused or seldom used attribute identifier. After the beginning of group identifier is inserted into the packet, the attribute read is inserted into the packet in step 530. Process 500 then repeats from step 505.

If the attribute is not the beginning of a group or a sub-group, process 500 determines whether the attribute is the end of a group or a sub-group in step 540. This may be determined from a flag or other field in the attribute or may be determined from a group count, or by any number of other methods. In step 545, the attribute is inserted into the packet and an end of group identifier is inserted into the packet after the attribute. If the attribute is an end of a sub-group, the end of sub-group identifier entered may or may not be an attribute that is different from the end of group identifier. Process 500 then repeats from step 505.

If the attribute is determined not to be an end of group or subgroup identifier in step 540, process 500 inserts the attribute in the packet at step 530 and repeats from step 505.

Figure 6:
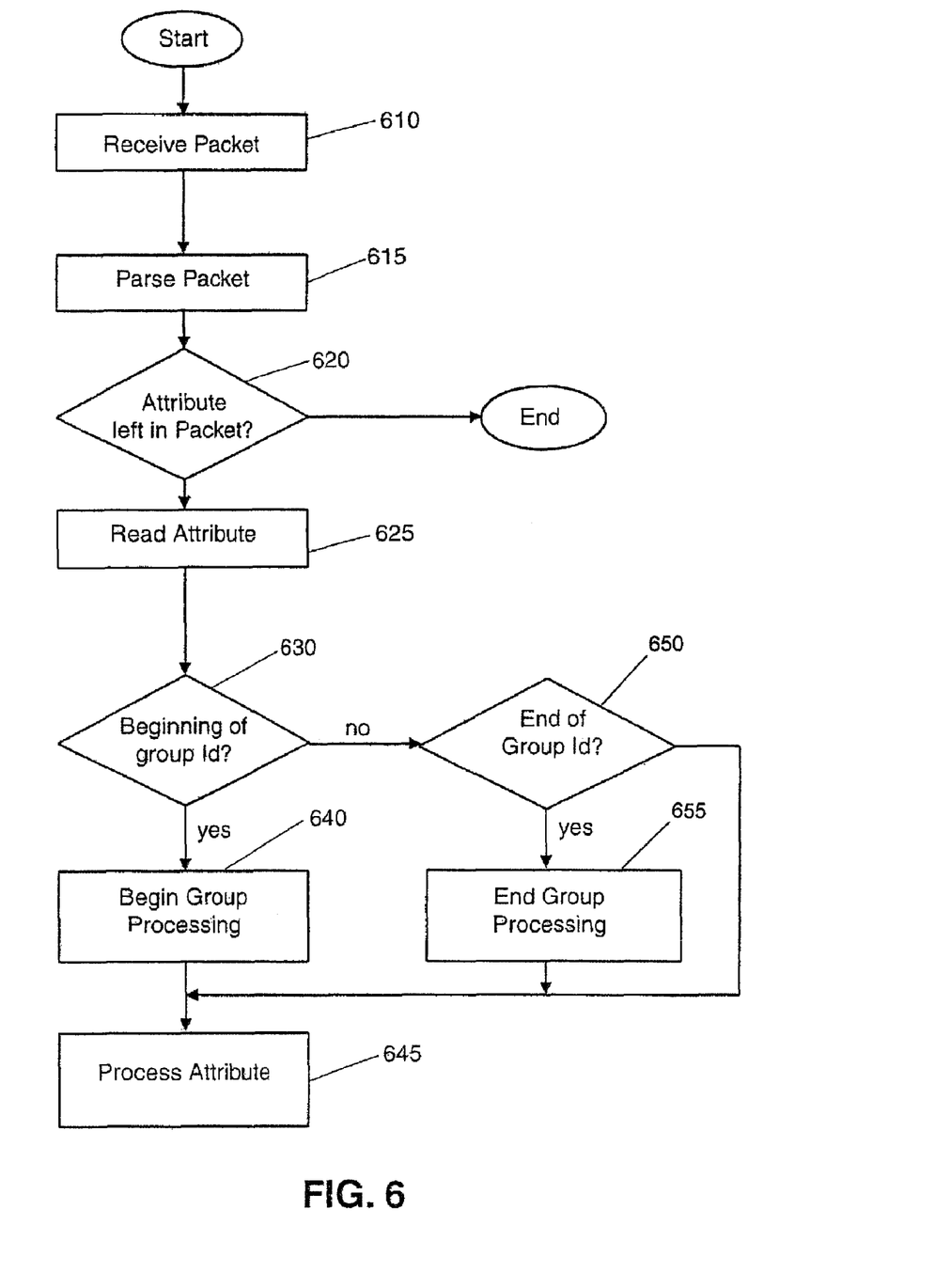
FIG. 6 illustrating a flow diagram of a process for reading groups of attributes from a packet in accordance with an embodiment of this invention.

FIG. 6 illustrates an exemplary process 600 executed by a processing system that receives a packet for reading attributes from a packet generated in accordance with this invention. Process 600 begins in step 610 by receiving the packet. In step 615, process 600 parses the packet into fields to read data from the packet. Process 600 then begins to process attributes by determining whether there is an attribute remaining in the packet in step 620. If the packet does not have another packet to read, process 600 ends.

If there is an attribute remaining in the packet, process 600 reads an attribute from the packet in step 625. In step 630, process 600 determines whether the attribute read is a beginning of group identifier. If the read attribute is a beginning of group identifier, process 600 begins a group processing in step 640 and processes the attribute in step 645. Processing the attribute may include storing the attribute to an appropriate file or transmitting the attribute to another application.

In step 650, process 600 determines whether the read attribute is an end of group identifier or end of sub-group identifier. If the attribute is an end of group or sub-group identifier, process 600 ends group processing for current group or sub-group in step 655 and processes the attribute in step 645. Otherwise, process 600 simply process the attribute in step 645. After step 645, process 600 repeats from step 625

As any person skilled in the art of computing arts will recognize from the previous description and from the figures and claims, modifications and changes can be made to the preferred embodiments of the invention without departing from the scope of the invention defined in the following claims.

What is claimed is:

1. A method comprising:

identifying a plurality of RADIUS attributes to be transmitted from a first processing system to a second processing system over a network to establish a virtual private network (VPN) tunnel;

forming a group of at least some of the plurality of RADIUS attributes that are related to the VPN tunnel;

generating a packet;

inserting into said packet, by said first processing system, a particular RADIUS vendor specific attribute (VSA) designated as a beginning of group identifier;

inserting into said packet, by said first processing system, the group of RADIUS attributes, behind said particular RADIUS VSA designated as said beginning of group identifier, said plurality of RADIUS attributes in said group presented in said packet absent any individual tags that identify each attribute as a part of a group;

inserting into said packet, by said first processing system, a particular RADIUS VSA designated as an end of group identifier, behind said group of RADIUS attributes; and transmitting said packet from said first processing system to said second processing system, wherein said particular RADIUS VSA designated as said beginning of group identifier is the same attribute as said particular RADIUS VSA designated as said end of group identifier.

2. The method of claim 1 wherein said particular RADIUS VSA designated as said beginning of group identifier indicates a length of said group of RADIUS attributes.

3. The method of claim 1 further comprising:

forming a sub-group of at least two of said plurality of RADIUS attributes of said group;

inserting into said packet, by said first processing system, a particular RADIUS attribute designated as a beginning of sub-group identifier, behind one of said plurality of RADIUS attributes of said group;

inserting into said packet, by said first processing system, said sub-group of at least two of said plurality of RADIUS attributes, behind said particular RADIUS attribute designated as said beginning of sub-group identifier; and inserting into said packet, by said first processing system, a particular RADIUS attribute designated as an end of sub-group identifier, behind said sub-group of at least two of said plurality of RADIUS attributes.

4. An apparatus comprising:

a network connector configured to couple the apparatus to a network;

a processor; and a memory configured to store executable instructions, the executable instructions when executed by the processor, to:

identify a plurality of RADIUS attributes to be transmitted from the apparatus via the network connector to a second apparatus to establish a virtual private network (VPN) tunnel, form a group of at least some of the plurality of RADIUS attributes that are related to the VPN tunnel, generate a packet, insert into said packet a particular RADIUS vendor specific attribute (VSA) designated as a beginning of group identifier, insert into said packet the group of RADIUS attributes, behind said particular RADIUS VSA designated as said beginning of group identifier, said plurality of RADIUS attributes in said group presented in said packet absent any individual tags that identify each attribute as a part of a group, insert into said packet a particular RADIUS VSA designated as an end of group identifier, behind said group of RADIUS attributes, and transmit said packet via the network connector to said second apparatus, wherein said particular RADIUS VSA designated as said beginning of group identifier is the same attribute as said particular RADIUS VSA designated as said end of group identifier.

5. The apparatus of claim 4 wherein said particular RADIUS VSA designated as said beginning of group identifier indicates a length of said group of RADIUS attributes.

6. The apparatus of claim 4 wherein said memory is further configured to store executable instructions that when executed by the processor:

form a sub-group of at least two of said plurality of RADIUS attributes of said group;

insert into said packet a particular RADIUS attribute designated as a beginning of sub-group identifier, behind one of said plurality of RADIUS attributes of said group;

insert into said packet, by said first processing system, said sub-group of at least two of said plurality of RADIUS attributes, behind said particular RADIUS attribute designated as said beginning of sub-group identifier; and insert into said packet, by said first processing system, a particular RADIUS attribute designated as an end of sub-group identifier, behind said sub-group of at least two of said plurality of RADIUS attributes.

\* \* \* \* \*

UNITED STATES PATENT AND TRADEMARK OFFICE
CERTIFICATE OF CORRECTION

PATENT NO. : 7,787,497 B1
APPLICATION NO. : 10/379513
DATED : August 31, 2010
INVENTOR(S) : Allen Long et al.

It is certified that error appears in the above-identified patent and that said Letters Patent is hereby corrected as shown below:

Title page Abstract, (57), please amend as shown:

A system for inserting data into data packets of a protocol for transmitting network information between processing systems connected to a network. The system identifies attributes of the network to be transmitted in a packet. The system then forms a group of attributes that are closely related. A beginning of group[[ identifiers]] identifier is inserted into a packet. The group is then inserted into the packet following the identifier. An end of group identifier inserted into the packet after the group.

Signed and Sealed this

Sixteenth Day of November, 2010

David J. Kappos
*Director of the United States Patent and Trademark Office*